United States Patent [19]
Knuutila et al.

[11] Patent Number: 6,131,040
[45] Date of Patent: Oct. 10, 2000

[54] WIRELESS COMMUNICATION DEVICE RECEIVING CONFIGURATION DATA FROM MULTIPLE SOURCES

[75] Inventors: Jarno Knuutila; Jyri Rauhala; Mikko Terho; Reijo Paajanen, all of Tampere, Finland

[73] Assignee: Nokia Mobile Phones Limited, Espoo, Finland

[21] Appl. No.: 09/099,487

[22] Filed: Jun. 17, 1998

[30] Foreign Application Priority Data

Jun. 19, 1997 [FI] Finland .................................. 972665

[51] Int. Cl.[7] ...................................... H04Q 7/32
[52] U.S. Cl. ..................... 455/550; 455/556; 455/557; 455/558; 455/418
[58] Field of Search ..................... 455/556, 557, 455/558, 559, 550, 551, 552, 553, 410, 411, 418, 419, 420; 364/705.05

[56] References Cited

U.S. PATENT DOCUMENTS

| | | | |
|---|---|---|---|
| 5,249,218 | 9/1993 | Santon | 455/418 |
| 5,465,401 | 11/1995 | Thompson | 455/411 X |
| 5,884,168 | 3/1999 | Kolev et al. | 455/551 X |
| 5,943,624 | 8/1999 | Fox et al. | 455/558 X |
| 5,956,651 | 9/1999 | Willkie et al. | 455/558 X |

*Primary Examiner*—Fan Tsang
*Assistant Examiner*—Philip J. Sobutka
*Attorney, Agent, or Firm*—Perman & Green, LLP

[57] ABSTRACT

The invention relates to a wireless communication device (1) comprising a basic part (2, 22), an adapter unit (4a, 4b, 4n) and means for transferring signals between the basic part (2, 22) and the adapter unit (4a, 4b, 4n). The basic part has memory means (14) and a control unit (13) for controlling the functions of the wireless communication means (1). The adapter unit (4a, 4b, 4n) arranged to be connected to the basic part comprises means for transferring information between the wireless communication device (1) and at least one data transmission network, and means for storing the type data (ID) of the adapter unit, which type data identifies said data transmission network. The wireless communication device further comprises means for examining the type data (ID) of the adapter unit, means for loading the configuration data (syst(1), syst(2), . . . syst(N)) of the adapter unit (4a, 4b, 4n) connected to the basic part (2, 22) at the time, and means (13, 14) for configuration of the wireless communication device (1) on the basis of the loaded configuration data (syst(1), syst(2), . . . syst(N)).

20 Claims, 5 Drawing Sheets

WIRELESS COMMUNICATION DEVICE RECEIVING CONFIGURATION DATA FROM MULTIPLE SOURCES

FIELD OF THE INVENTION

The present invention relates to a wireless communication device described in claim 1 used with wireless data transmission systems of various kind. The invention further relates to a method for configuration of a wireless communication device.

BACKGROUND ART

Popularity of wireless communication devices, particularly mobile stations is still growing rapidly. Owing to this, the capacity of present mobile station networks is occasionally almost fully occupied, wherein situations may occur, when the data transmission connection cannot be formed at the very moment when the user wishes. The capacity of existing mobile communication systems cannot always be increased, but for serving additional users new mobile station networks are built. In such new mobile station networks, the geographical coverage is not necessarily very wide at the initial phase and, consequently, it is useful if the user is able to choose a network whose coverage area he or she is located in at the time. For this purpose so-called multi-mode phones have been developed, these being connectable to two or even more various mobile station networks.

Mobile stations are used also for transmitting other information than speech. Many users have also a portable laptop PC at their disposal, wherein they have a possibility to send and receive e.g. facsimile copies, e-mail, files or even video image by using a mobile station network. Further, the use of Internet network on the move is increasing e.g. because of the fact that via Internet network one can find a myriad of information which the user needs at the time. Such system allowing the movability of the user adds to the productivity of the user e.g. by increasing the efficiency of data acquisition and data transmission.

Increasing use of mobile station networks has accelerated design of new, more efficient mobile station networks. However, the design has not lead into one common standard, instead various mobile station standards have been developed, wherein it is very difficult, if not even impossible, to implement mobile stations by using prior art solutions in a manner that the implementation of the mobile station covers all possible mobile station networks. On the one hand, there exists a need to manufacture mobile stations which can be connected to more than one mobile station network, e.g. as a result of said increased mobility of users. On the other hand, manufacturing costs of a mobile station should be kept at a reasonable level, e.g. because of the fact that increasing competition on the mobile station markets decreases selling prices, which for its part limits the quantity of properties implemented in one mobile station.

Mobile stations that can be connected to various mobile station networks comprise e.g. separate radio parts for each mobile station network. However, a part of the functions, such as the display, keypad, microphone and earpiece are common for all the modes. One drawback of such mobile stations is that it has so far been impossible to manufacture them in small size, and furthermore, their manufacturing costs are relatively high. A further disadvantage that can be mentioned is the fact that such mobile stations only operate in those mobile station networks which have been selected by providing at the manufacturing phase the mobile stations with functions corresponding to these networks. However, the user may change his or her location to areas where no system defined in the mobile station is available, but where possibly some other system is used. Thus, the use of such mobile stations is not very flexible, particularly in situations where the type of mobile station network which can be used in said location is not known in advance. The user should thus have several different mobile stations in order to ensure that connecting is successful.

Finnish patent FI-89434 of the applicant describes a radio telephone assembled of separate modules and comprising a basic module and at least one additional module which can be coupled thereto in a detachable manner. The radio telephone described in the patent publication is regarded as being connectable either to an analog or digital mobile station network, according to what is needed, wherein the basic module comprises such parts and functions that are common to telephones operating both in analog and digital modes. The additional module coupled to the basic module includes at least the main part of the electrical circuits required for sending and receiving an analog signal, wherein when it is coupled to the basic module, the telephone operates as an analog telephone. On the other hand, it is possible to couple to the basic module an additional module which includes at least a main part of the electrical circuits that are required for sending and receiving a digital signal, wherein when it is coupled to the basic module the telephone operates as a digital telephone.

Finnish patent application FI-952814 of the applicant describes another solution for forming a data transmission connection with two or more different mobile station networks. A telecommunication terminal described in the publication comprises means for forming a connection to different mobile station networks, wherein the telecommunication terminal examines, when the connection is formed, which mobile station networks are available in the area in question, and selects one of these mobile station networks and sets the operating mode of the telecommunication terminal to correspond to the selected mobile station network. To a this type of mobile station network or to a coupling unit connected thereto an additional unit has been mounted in advance for each mobile station network that is arranged to be selected.

In practice, the implementation of mobile stations involves several drawbacks restricting the quantity of properties that can be added to one mobile station. In particular manufacturing costs and the small size of the devices are such restricting factors, wherein in practical mobile stations it is possible to implement at the most two or three different systems or protocols. However, since there exists a much larger number of different mobile station networks, analog and several digital systems, the number of different system combinations is very large, which by using prior art techniques means that it is not sensible to implement all the possible combinations in mobile stations.

In accordance with functions, mobile stations can be mainly divided into to separate parts:

A basic part comprising those functional portions which can be used in mobile stations according to different mobile communication systems, and a control unit. This part typically comprises processing portions of signal, e.g. processing means, memory means, keypad, earpiece, display and microphone.

A particular part whose properties depend on the system, standard and protocol. Thus, in this part those special features are implemented which cannot be implemented collectively for the different systems. In practise, this part can be further divided into software and equipment parts. The software part comprises the system specific software which, together with the basic part and the system dependent part, implement functions of a certain protocol or system. The equipment part typically comprises the data transmission devices used at the time in wireless communication devices, e.g. a radio part or an infrared sender/receiver. In other words, the system specific equipment part enables a wireless data transmission between a terminal equipment (TE) and an access point (AP) of the system in accordance with the system specifications.

SUMMARY OF THE INVENTION

One object of the present invention is to implement a wireless communication device which can be connected to mobile station networks of different types by coupling to the wireless communication device an adapter unit corresponding to the data transmission network/protocol intended to be used at the time. The invention is based on the idea that to the basic part of the wireless communication device an adapter unit can be coupled which comprises at least one equipment part of the data transmission system, e.g. a radio part of the mobile station network, and that the basic part comprises means for identification of the adapter unit and configuration of the basic part to correspond to the adapter part coupled to the basic part. The wireless communication device of the present invention is characterized in what is described in the characterizing part of the accompanying claim 1. The method of the present invention is characterized in what is described in the characterizing part of the accompanying claim 8.

The present invention involves considerable advantages. To the wireless communication device of the invention an adapter unit of a desired type can be coupled, wherein the wireless communication device recognizes the coupled adapter unit, and on the basis thereof automatically configures the wireless communication device in a manner that the wireless communication device operates in the selected mobile communication system or other data transmission system. This kind of modularity portion can be used for decreasing the size of the adapter units, because the main part of the functions, e.g. the signal processing, is located in the basic part. This also enables manufacturing of adapter units at lower costs and in smaller size. Adapter units can be manufactured after introduction of new mobile communication systems, wherein the user is not obliged to obtain a wireless communication device, but only a new adaptation unit when wishing to use a new system. A wireless communication device of the invention is easy to implement among other things in combination of a portable data processing unit (laptop PC), e.g. as a so-called PCMCIA card (Personal Computer Memory Card Interface Association), whereto the adaptation unit is connectable. Thus, configuration data corresponding to different mobile communication systems can be stored even into a memory of a portable data processing unit, e.g. into hard disk, or it can be loaded from a separate data carrier, such as FLASH memory or diskette. In one advantageous embodiment, the configuration data is stored into an adapter unit from which it can be fetched to the basic part in order to implement the configuration.

BRIEF DESCRIPTION OF THE DRAWINGS

In the following, the invention is illustrated in more detail with reference made to the accompanying drawings, in which.

DETAILED DESCRIPTION OF THE PREFERRED EMBODIMENTS

Figure 1:
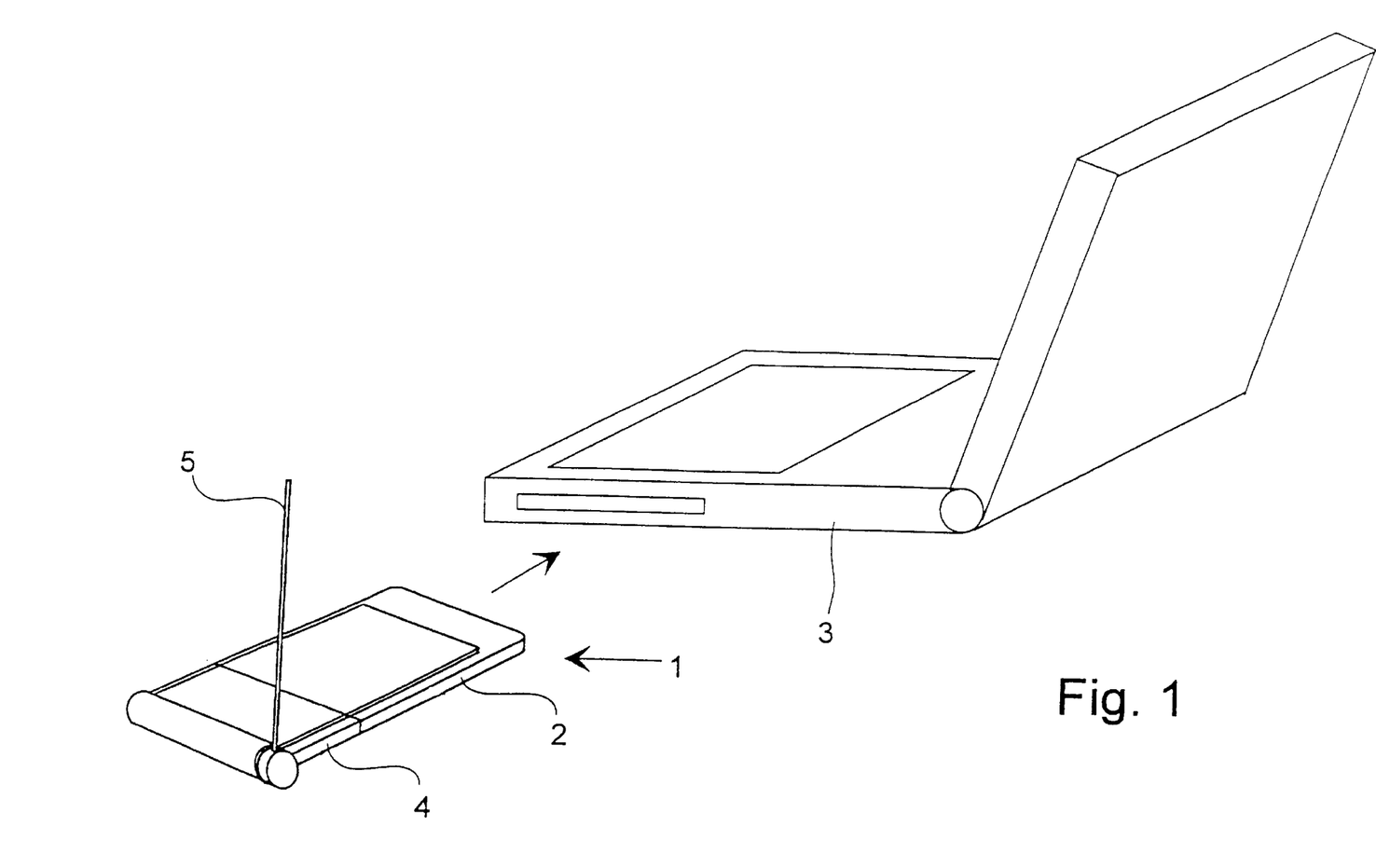
FIG. 1 shows a perspective view of a wireless communication device in accordance with one advantageous embodiment to the invention.

FIG. 1 shows a communication device 1 in accordance with the first advantageous embodiment of the invention implemented by an interface card 2 according to the so-called PCMCIA standard. This interface card 2 can be coupled e.g. to a corresponding PCMCIA interface 9 of a portable laptop PC 3. The PCMCIA interface card forms in this embodiment a basic part of the wireless communication device 1, which basic part comprises those functional parts of the wireless communication device which are common regardless of the data transmission system used at the time. The wireless communication device 1 further comprises a changeable adapter unit 4 connected to the interface card 2. The adapter unit 4 comprises advantageously the functional parts required for implementation of the properties of one or two different data transmission systems, e.g. a radio part 18 and an antenna 5 and/or infrared data transmission means (not shown) connected thereto.

Figure 2A:
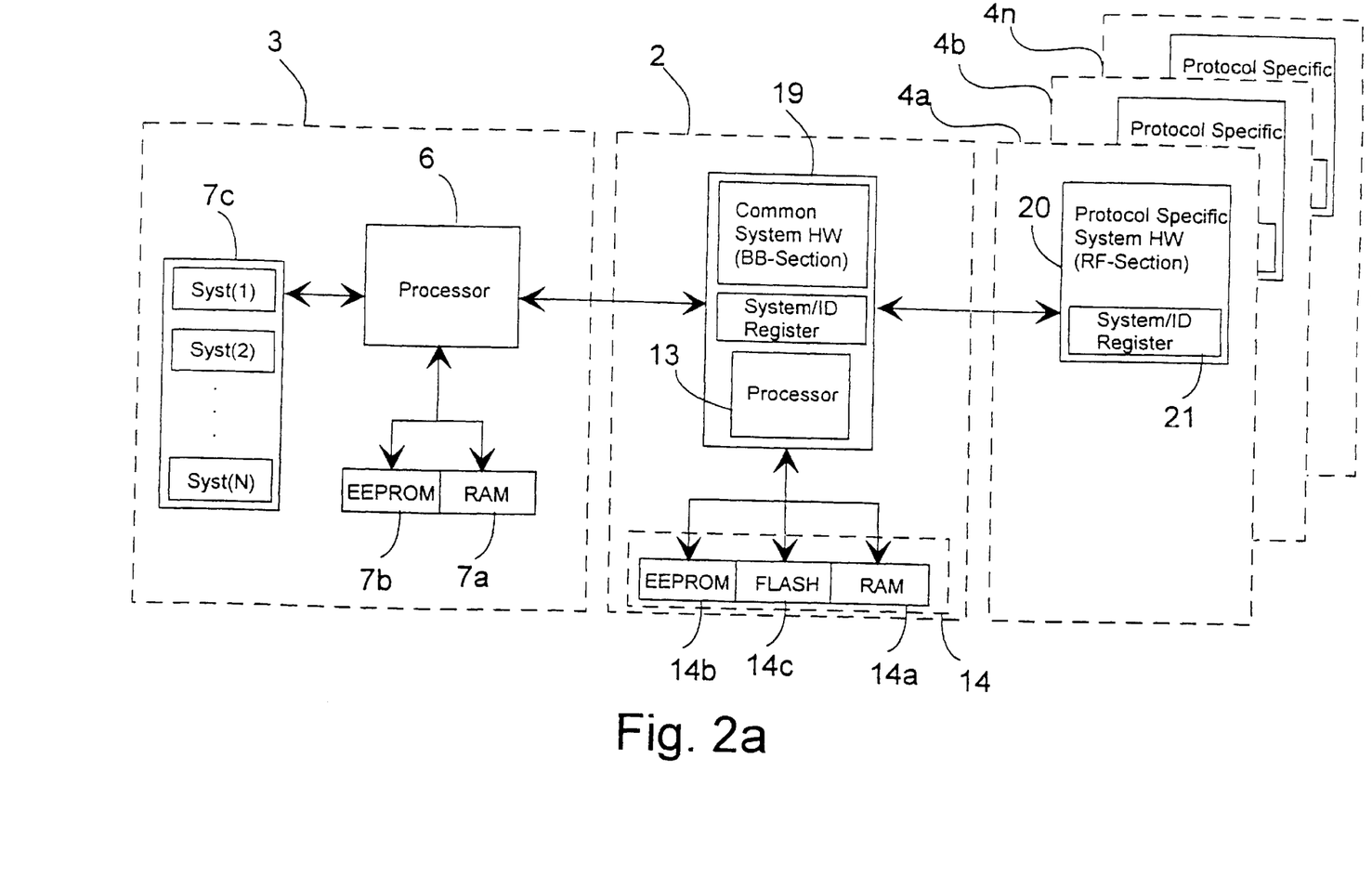
FIG. 2a shows positioning of different functional blocks in a wireless communication device according to the first embodiment of the invention.
Figure 2B:
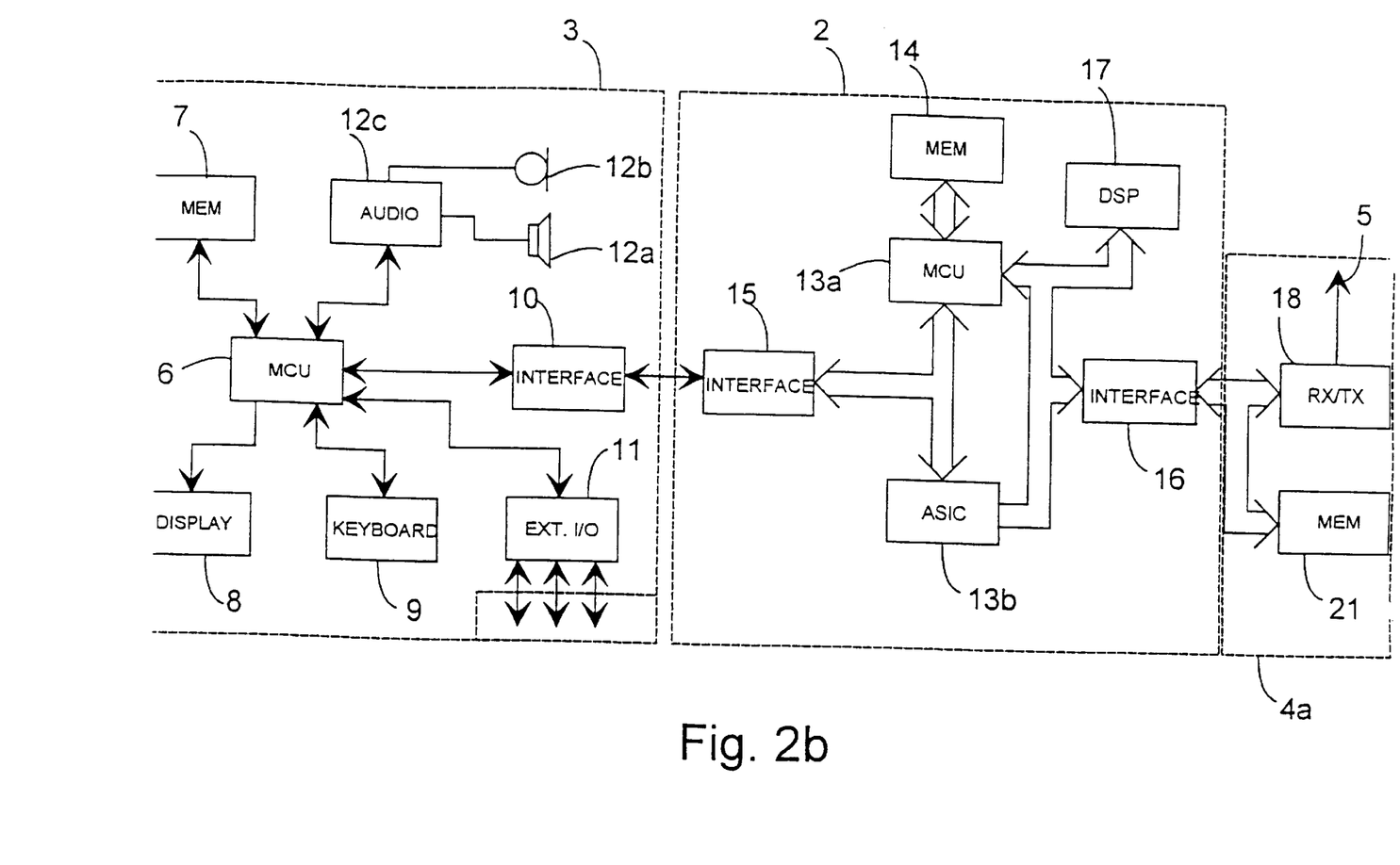
FIG. 2b shows a reduced block diagram of a wireless communication device according to the first advantageous embodiment of the invention.

FIG. 2a shows the positioning of the functional parts that takes place between different units of the wireless communication device 1 in accordance with the first advantageous embodiment of the invention. In a corresponding manner, FIG. 2b shows a reduced block diagram of a wireless communication device 1 according to the first advantageous embodiment of the invention. In this embodiment the wireless communication device 1 is connected to a data processing unit 3 comprising, which is known as such, e.g. a control unit 6, memory means 7, display 8, keypad 9, PCMCIA interface block 10 and external interface block 11. Further, the block diagram of FIG. 2b shows audio means 12, such as earpiece 12a, microphone 12b and audio block 12c, e.g. for transforming a microphone signal from analog to digital, and for transforming a signal directed to the earpiece 12a from digital to analog. The memory means 7 comprise among other things random access memory (RAM) 7a, particularly for storing data needed during the use of the data processing unit 3, advantageously non-volatile rewriteable memory 7b, e.g. EEPROM memory (Electrically Erasable Programmable Read-Only Memory), FLASH memory or ROM (read only memory) particularly for storing programs, and writeable mass storage memory 7c, such as a hard disk, for storing data and programs.

As known, from a hard disk it is usually possible to load data and programs stored into files to random access memory and possibly also to non-volatile random access memory.

In the memory means 7 of the data processing unit 3, advantageously in the writeable mass storage memory 7c is stored data, such as program modules for different protocols and systems, needed in use of a plurality of different data transmission systems. In FIG. 2a, the block 7c illustrates writeable mass storage memory, advantageously a hard disk, wherein program modules syst(1), syst(2), . . . syst(N) corresponding to different systems are stored.

An interface card 2 in FIG. 2b comprises among other things a control unit 13 consisting of e.g. a microcontroller 13a (MCU, microcontroller unit) and a programmable logic circuit 13b (ASIC, Application Specific Integrated Circuit), memory means 14, such as random access memory 14a (RAM) and read only memory 14b (ROM/EEPROM). Additionally, the interface card 2 comprises a PCMCIA interface block 15, interface block 16 for the adapter and a digital signal processing unit 17. Thus, the interface card 2 primarily comprises those equipment portions which are common regardless of the data transmission system used at the time. Consequently, the equipment portion comprises a sufficient quantity of processing and memory capacity for processing different data transmission protocols, e.g. one or two protocols simultaneously.

The memory means 14 of the interface card contain stored the basic software of the interface card for controlling the interface card. Into the memory means 14, preferably from the data processing unit 3, are loaded the program modules according to the data transmission system used at the time, these program modules actuating the interface card in the selected data transmission system. The program modules contain data e.g. of the audio track width, modulation method, data transmission channels and channel frequencies used in the data transmission system in question. The functional block diagram of the interface card 2 illustrated in FIG. 2a is composed of a common equipment part 19 (common system HW) of the wireless communication device, said part comprising among other things signal processing properties, and memory means 14 whereto the program module according to the system used at the time is loaded for use.

The interface card 2 comprises a bootstrap code of the interface 2 stored into non-volatile memory, e.g. electrically erasable programmable read-only memory 14b (EEPROM), and a certain basic program for controlling the operation of the interface card 2.

To the interface card 2 can be connected an adapter unit 4 comprising advantageously equipment parts 20 required for the implementation of one or two different data transmission systems, and means 21 for storing the type data ID of the adapter unit (System/ID Register). E.g. a wireless communication device 1 according to FIG. 2b comprises a first adapter unit 4a consisting of among other things a radio part 18, antenna 5 and storing means 21 for the type data. The radio part 18 is e.g. a radio part of the GSM mobile communication system. In a functional block diagram illustration of FIG. 2a, three adapter units 4a, 4b, 4n are shown in an exemplifying manner, these being connectable to the interface card 2, but the invention is not restricted only to the adapter units 4a, 4b, 4n described at the present specification. The block 20 in the first adapter unit 4a illustrates this system dependent equipment part, whose detailed structure can thus be very different in different data transmission systems. The adapter unit 4a, 4b, 4n can include also more than one system specific adapter block 20 and storing means 21 for type data, e.g. for situations where the wireless communication device 1 of the invention should be coupled simultaneously to a plurality of data transmission systems. One example of such situation is that the adapter unit 4a, 4b, 4n comprises a radio part 18 regarded for actual remote data transmission and e.g. an infrared interface unit for local data transmission by means of which the wireless communication device 1 can be coupled to another data processing device, such as a printer with corresponding infrared data transmission equipment. One protocol designed for infrared data transmission is defined in IrDA standard (Infrared Data Association) serving a basis for data transmission devices which have already been designed as commercial products.

In the following the operation of a wireless communication device 1 according to the first advantageous embodiment of the invention will be described. In a situation where the interface card 2 is connected to a data processing unit 3, this causes e.g. an interruption request signal by means of a PCMCIA interface 10, 15 to a control unit 6 of the data processing unit 3. After detecting the interruption request, the control unit 6 performs an interruption service program arranged for this purpose and defining those operations that have to be taken in connection with connecting the interface card 2. Such operations are e.g. identifying the type of the interface card 2 and setting, on the basis of the type of this interface card 2, some parameters controlling the operation of the interface card 2. In PCMCIA standards, a so-called card information structure (CIS) data base is used in the identification of the type of the interface card 2, the interface card 2 transmitting said data base to the data processing unit 3 when the interface card 2 is started. All above mentioned measures are not necessarily performed in the interruption service program. Thus, the interruption service program sets information (ticket) related to coupling of the interface card and in the main program loop of the application software of the data processing unit, said information is examined and there is performed a subprogram where the above mentioned measures are taken. The advantage of this solution is that the interruption service program can be made short and quick, wherein other interruption requests of a lower level can be detected more quickly. This is technique known as such by a professional in the field, so a more detailed description is not necessary in this context.

In connection with starting the interface card and when changing the adapter unit 4a, 4b, 4n to the interface card 2, the control unit 13 of the interface card examines the type of the adapter unit 4a, 4b, 4n. This can be performed e.g. in a manner that in the adapter unit 4a, 4b, 4n non-volatile memory has been arranged, where the identification parameters of the adapter unit 4a, 4b, 4n are located. Thus, the control unit 13 reads these parameters and on the basis of these identifies the type of the adapter unit 4a, 4b, 4n.

Subsequent to the identification of the type of the adapter unit 4a, 4b, 4n, on the basis of the type of this adapter unit a program module applicable for a system in accordance with the adapter unit is started to load to the interface card 2. This can be implemented e.g. in a manner that the interface card 2 forms an interruption request to the control unit 6 of the data processing unit, said unit performing an interruption service program corresponding to the interruption request. In this connection the interface card 2 transmits to the data processing unit 3 the information related to the type of the adapter unit 4a, 4b, 4n. The control unit 6 of the data processing unit fetches on the basis of the type of this adapter unit 4a, 4b, 4n the appropriate program module from the memory means 7 of the data processing unit, e.g. hard disk 7c. The program module is transferred to the memory means 14 of the interface card 2, advantageously FLASH memory 14c.

FLASH memory is a special type of non-volatile memory which can be erased and programmed by blocks. In a typical manner, erasure and programming of EEPROM memories are performed a byte at a time. FLASH memories are already available commercially and they are nowadays very widely used e.g. in wireless data transmission devices. FLASH memories make it possible to change the operation of the basic equipment by changing a new application software to the FLASH memory.

To the interface card 2 can be loaded a program module applicable for an adapter unit type 4a, 4b, 4n. The control unit 13 of the interface card advantageously compares the type ID, which is possibly present in the memory means 14, to the type of the adapter unit 4a, 4b, 4n. In case the comparison shows that the types match, there is no need to load a program module to the interface card 2, wherein the interface card uses the program module loaded in the memory means 14 and moves to a normal operating mode employing operation parameters according to the type ID of the adapter unit and functions arranged in the program module. In case no program modules used in the control of the adapter unit are loaded in the interface card 2, or the types ID of the program module and the adapter unit do not correspond to each other, the loading of the program module to the interface card 2 is started as follows.

The control unit 13 of the interface card informs the control unit 6 of the data processing unit of the loading request of the program module. This can be done in a method known as such, e.g. by forming an interruption request or by transmitting a loading request message from the interface card 2 to the data processing unit 3. Subsequent to detecting the interruption request or the loading request message, the control unit 6 of the data processing unit moves to perform the loading. First, the control unit 6 of the data processing unit examines the type ID of the adapter unit coupled to the interface card 2. This is performed e.g. in a manner that the control unit 13 of the interface card waits for a confirmation of the loading request message from the control unit 6 of the data processing unit, whereafter the control unit of the interface card transmits the type ID of the adapter unit to the control unit 6 of the data processing unit. Subsequent to the so-called handshaking procedures, the loading of the program module from the data processing unit 3 to the interface card 2 is started.

The program module consists typically of program commands and data, such as operation parameters, controlling the operation of the control unit 13 of the interface card. Each program command and data comprise advantageously one or more byte or word. The byte width of known control units is usually eight bits and the word width 16, 32 or 64 bits.

For loading the program module, the control unit 6 of the data processing unit looks among memory means 7, e.g. a hard disk, for a program module syst(1), syst(2) syst(N) according to the type ID of the adapter unit connected to the interface card 2. In case the program module is found, it is transferred first preferably to a random access memory 7a of the data processing unit 3, either entirely or partially. Subsequently, the program module is transferred to the interface card 2. The loading can be implemented e.g. in message form, wherein the message comprises transferable data and potentially also checking and correction data for the detection and correction of transfer errors. The message also includes information of the length of the message, in case the length of the message is not constant. The control unit 6 of the data processing unit reads a byte or word of the message at a time and transmits it to the control unit 13. The control unit of the interface card transmits the message it had received advantageously to a message buffer which is a message area reserved for this purpose e.g. in a random access memory 14a of the memory means of the interface card. In case error checking is used in the transfer of messages, the control unit 13 of the interface card confirms after the transfer whether the transfer was successful (ACK, positive acknowledgement) or unsuccessful (NACK, negative acknowledgement). The transfer of an unsuccessful message can be tried again, or the control unit 13 of the interface card can try to correct the errors, in case error correction data has been coded on the message and the quantity of the mistakes does not exceed the error correction capacity of the error correction code.

By interface card 2 the messages are transferred from the message buffer in the memory means 14 preferably to a non-volatile random access memory 14c to a part reserved for the program module, preferably after the possible error checkings and error corrections have been performed and the message is noticed to be unerroneus.

In case the entire program module did not fit into one message, a new message is formed having the following part of the program module, and the transfer described above is performed. The formation and transfer phases of the message are repeated as long as the entire program module has been transferred.

In the application software of the interface card 2 is formed a loading program by means of which the above-described reception and transfer operations of messages are performed to the memory means 14 of the interface card 2 to a location reserved for the program module. It is obvious, that the program module can also be transferred also by using known methods, other than the above described message-formed transfer.

After the loading of the program module syst(1), syst(2), syst(N) has been performed, the interface card 2 changes over to perform the operations of the data transmission system in accordance with the adapter unit 4a, 4b, 4n. In this phase, the wireless communication device 1 thus operates on the basis of the specifications of the appropriate data transmission system. The wireless communication device 1 according to the advantageous embodiment of the invention connected to a data processing unit 3 can be used e.g. in transmission of e-mail and other data transmission embodiments e.g. to another data processing unit (not shown).

Figure 3:
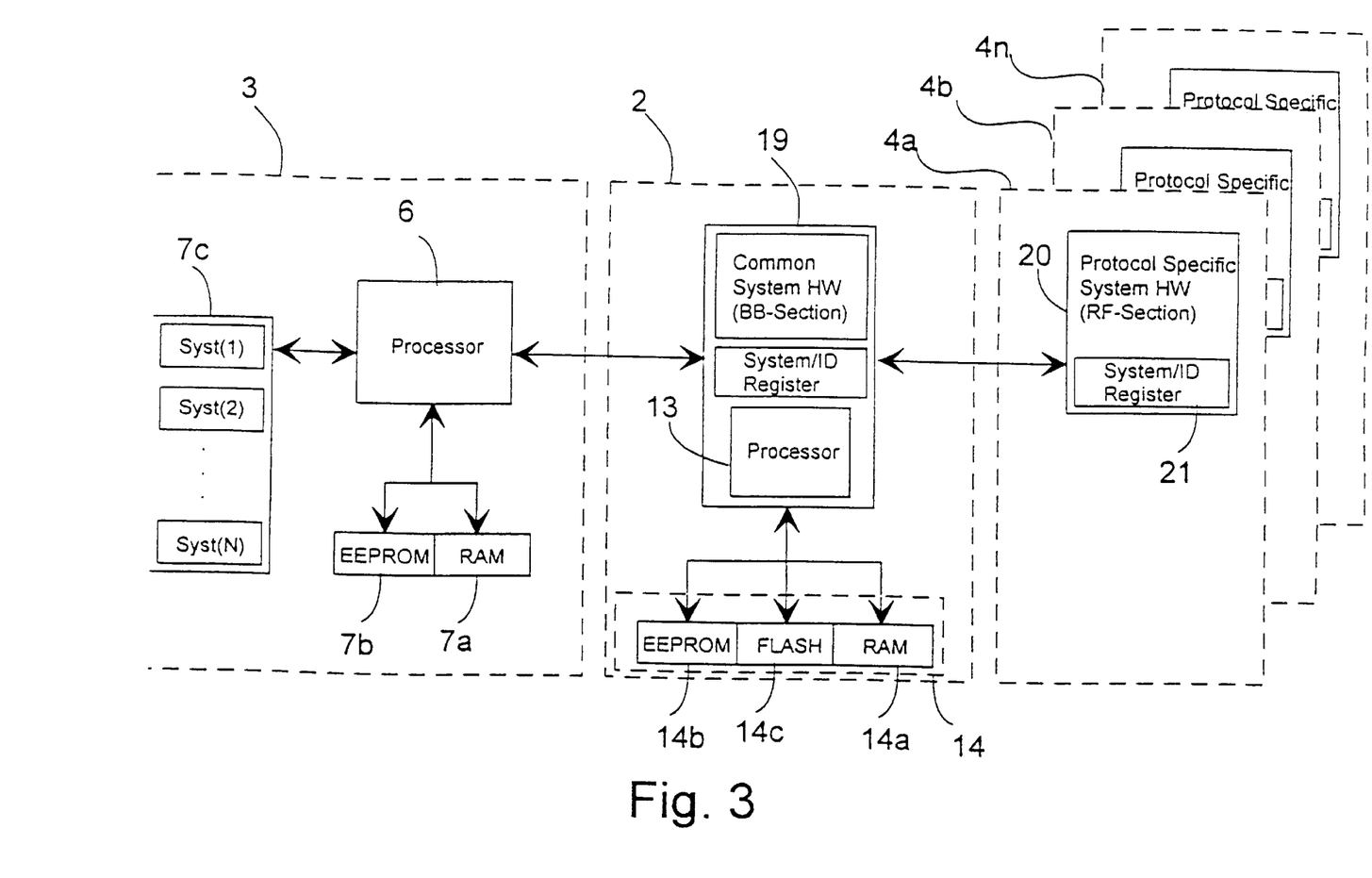
FIG. 3 shows positioning of different functional blocks in a wireless communication device according to the second embodiment of the invention.

FIG. 3 shows in a reduced form the positioning of functional parts of the wireless communication device 1 according to a second advantageous embodiment of the invention. The data processing unit 3 is a so-called personal digital assistant (PDA) or the like, whereto the wireless communication device 1 is connected. Also in this embodiment the interface card 2 comprises the basic parts of a wireless communication device and the adapter unit 4a, 4b, 4n connectable to the interface card 2 comprises the specific parts for the data transmission system/protocol. The interface card 2 can be e.g. a separate card arranged to be coupled to the personal digital assistant PDA or it can also be a fixed part of the personal digital assistant or the like.

The operation of a wireless communication device 1 according to the second advantageous embodiment of the present invention corresponds mainly to the operation of a wireless communication device 1 according to the first advantageous embodiment of the invention described above. The interface card 2 is connected to the data processing unit, and to the interface card 2 is connected an adapter unit 4a, 4b, 4n according to the selected data transmission system. In the initiation phase, the data processing unit 3 examines the type of the interface card 2 and performs the setting of operation parameters corresponding to the type of the interface card if needed. The control unit 13 of the interface card performs a starting program of its own in order to clarify among other things the fact whether an adapter unit 4a, 4b, 4n has been connected to the interface card 2. In case an adapter unit 4a, 4b, 4n is connected, the interface card examines the type of the adapter unit 4a, 4b, 4n e.g. in a manner described above in the present specification by reading the type data in the parameters stored into the memory of the adapter unit 4a, 4b, 4n. The control unit 13 of the interface card further examines whether the memory means 14, advantageously FLASH memory contains stored therein the program module of some adapter unit 4a, 4b, 4n. In case there exists a program module in the interface card 2, the control unit 13 further compares the type of the program module to the type of the adapter unit 4a, 4b, 4n that is connected. In case the type data correspond to each other, there is no need to load a new program module to the interface card, but the interface card can use the program module stored into the memory means 14. Subsequently, the control unit 13 can move to the normal operating mode.

In a situation when the interface card 2 does not have a stored operation mode, or the types of the program module and the adapter unit do not match, a program module corresponding to the type of the adapter unit 4a, 4b, 4n is loaded to the interface card 2. The loading can be performed e.g. in a manner illustrated above in the operational description of the wireless communication device 1 according to the first advantageous embodiment of the invention.

Subsequent to the loading, the interface card 2 and the adapter unit 4a, 4b, 4n connected thereto form a wireless communication device 1 according to the type of the adapter unit, wherein a data transmission connection can be formed in a data transmission system corresponding to the type, e.g. the GSM mobile communication system, provided that the wireless communication device 1 is located within the coverage area of the system in question.

Figure 4:
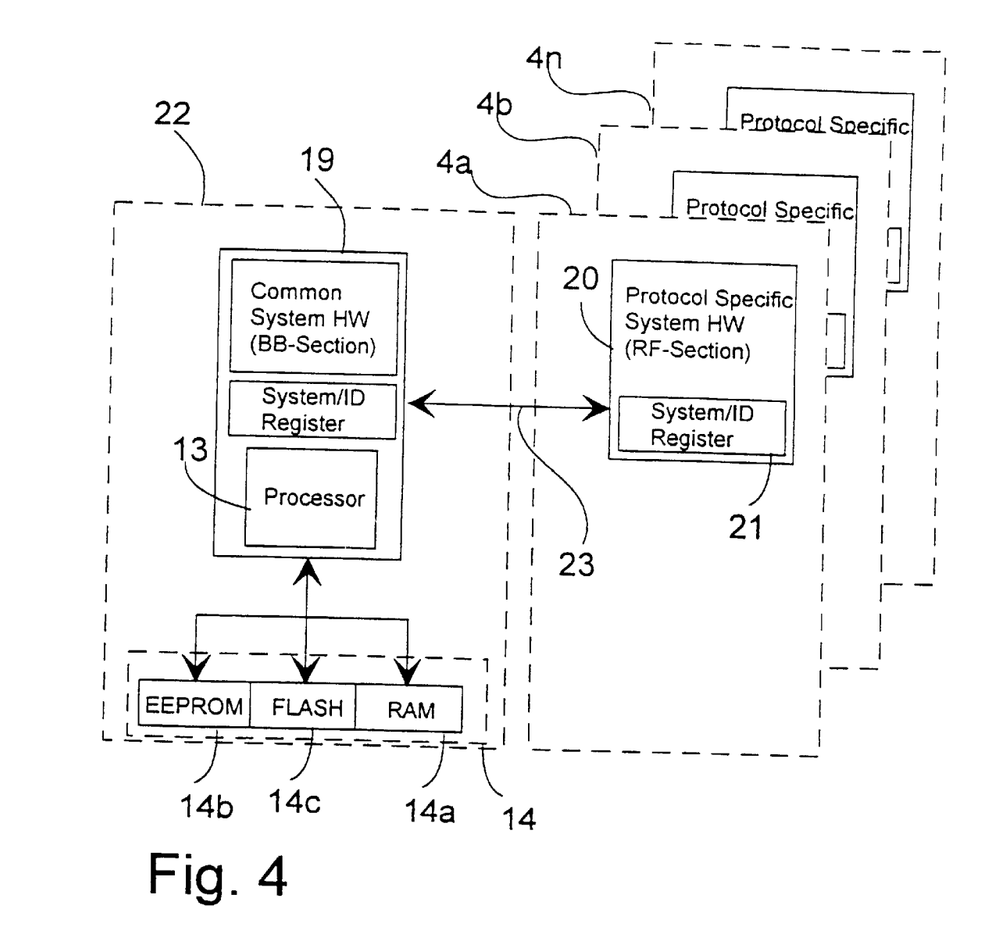
FIG. 4 shows a wireless communication device according to the third advantageous embodiment of the invention.

FIG. 4 shows in reduced form the positioning of the functional parts of the wireless communication device 1 in accordance with the third advantageous embodiment of the invention. The wireless communication device 1 comprises a handset 22 and an adapter unit 4a, 4b, 4n connectable thereto. The handset 22 comprises a so-called baseband part, such as an earpiece, microphone, audio amplifiers, signal processing unit and control unit 13. The signal processing unit can be implemented also in the application software of the control unit 13, which is known as such.

Into the adapter unit 4a, 4b, 4n is stored among other things the type data of the adapter unit, in a manner corresponding to that in connection with the above-described advantageous embodiment of the invention. In addition to the type data, a program module according to the type of the adapter unit is stored into the adapter unit. The program module is loaded from the memory means of the adapter unit to the memory of the handset 22 to a part reserved for the program module. In the loading, the same principles can be used as described above in connection with the loading performed from the data processing unit 3. This includes e.g. message based loading. Also other known methods can be used for transferring data from the adapter unit 4a, 4b, 4n to the handset 22 via an adapter unit interface, either in serial or parallel data transmission. In the accompanying FIG. 4, this is illustrated in a reduced manner by using an arrow 23. The adapter unit 4a, 4b, 4n and the adapter unit interface can be implemented also in a manner that the memory means of the adapter unit are connected to form a part of the memory space of the control part 13 of the handset, wherein via the adapter unit interface the address, data and control buses of the control unit 13 are transmitted to the adapter unit. Thus, it is not necessary to transfer the program module to the handset, but the program module can be used from the memory means of the adapter unit. However, this adds remarkably to the quantity of the contact pins of the adapter unit interface compared to an alternative that the program module is transferred to the handset 22.

Also in this embodiment the handset 22 comprises the basic part of the wireless communication device, and an adapter unit 4a, 4b, 4n connectable to the handset 22 comprises the specific parts of the data transmission system/ protocol. The handset 22 corresponds, as to its properties, mainly to the interface card 2 of the above-described embodiments. However, in the handset 22 no interface to the data processing unit 3 is necessarily required, but the handset 22 and the adapter unit 4a, 4b, 4n connected thereto can be used as a wireless communication device 1 of the invention e.g. for transmission of telephone calls.

In the present invention, the basic part of the wireless communication device 1 is thus is composed of an interface card 2 or a handset 22 and the specific part is composed of an adapter unit 4a, 4b, 4n comprising the data transmission devices of at least one data transmission system. The configuration is arranged to be performed by a program module according to the type of the adapter unit, said program module being stored into memory means, advantageously located in the data processing unit 3 or the adapter unit 4a, 4b, 4n. Thus, by changing the adapter unit at desired the time to the basic part 2, 22 the wireless communication device 1 of the invention can be operated in a desired data transmission system. Joining to a new data transmission system can be implemented by only changing a new adapter unit 4a, 4b, 4n to the basic part 2, 22, whereafter the wireless communication device is configured automatically in accordance with said system.

Even though the above description includes e.g. the IrDA standard and the GSM mobile communication system, the invention can be adapted also in connection with data transmission systems of other types. Some examples mentioned in this context are wireless local nets (LAN), DECT, PHS, PDC and USTDMA. Further, the invention is not restricted only to PCMCIA interface, but also other types of interfaces between the data processing unit 3 and the interface card 2 are possible.

The invention is not restricted only to the embodiments described above, but it can be modified within the scope of the accompanying claims.

What is claimed is:

1. A wireless communication device comprising:

a basic part having memory means and a control unit for controlling the functions of the wireless communication means, an adapter unit arranged to be coupled to the basic part and comprising means for transmitting information between the wireless communication device and at least one data transmission network, and means for storing type data of the adapter unit, which type data identifies said data transmission network, means for transferring signals between the basic part and the adapter unit, means for examining the type data of the adapter unit to identify the adapter unit, means for examining the basic part to determine if corresponding configuration data can be found in the basic part for the adapter unit that has been identified;

means for loading the corresponding configuration data, for use by the basic part, if corresponding configuration data for the adapter unit which has been identified is found, in the basic part;

means for connecting the wireless communications device to a data processing unit;

means for transmitting, to the data processing unit, a request to find in the data processing unit corresponding configuration data for the adapter unit that has been identified, if the corresponding configuration data is not found in the basic part;

means for loading the corresponding configuration data, from the data processing unit, to the basic part, the corresponding configuration data containing configuration data for the adapter unit connected to the basic part at the time, and means for configuring the wireless communication device on the basis of the loaded configuration data.

2. The wireless communication device (1) according to claim 1 wherein the adapter unit (4a, 4b, 4n) comprises means (21) for storing the type data (ID).

3. The wireless communication device of claim 2, wherein the data processing unit comprises a mass storage memory storing means.

4. The wireless communication device (1) according to claim 3, wherein the configuration data is arranged to be read in the storing means (7) for the configuration data in the data processing unit.

5. The wireless communication device (1) according to claim 4 wherein the data processing unit (3) is a computer, and that the basic part (2) is a card according to the PCMCIA standard.

6. The wireless communication device of claim 5, wherein the computer is a portable laptop PC.

7. The wireless communication device (1) according to claim 4, wherein the data processing unit (3) is a personal digital assistant (PDA) and that the basic part (2) is an interface card arranged to be connected to the personal digital assistant (PDA) or the basic part (2) formed to constitute a part of the personal digital assistant (PDA).

8. The wireless communication device (1) according to claim 1, wherein the data processing unit (3) is a computer, and that the basic part (2) is a card according to the PCMCIA standard.

9. The wireless communication device of claim 8, wherein the computer is a portable laptop PC.

10. The wireless communication device (1) according to claim 2, wherein the data processing unit (3) is a personal digital assistant (PDA) and that the basic part (2) is an interface card arranged to be connected to the personal digital assistant (PDA) or the basic part (2) formed to constitute a part of the personal digital assistant (PDA).

11. The wireless communication device (1) according to claim 2, wherein the data processing unit (3) is a computer, and that the basic part (2) is a card according to the PCMCIA standard.

12. The wireless communication device of claim 11, wherein the computer is a portable laptop PC.

13. The wireless communication device (1) according to claim 1, wherein the data processing unit (3) is a personal digital assistant (PDA) and that the basic part (2) is an interface card arranged to be connected to the personal digital assistant (PDA) or the basic part (2) formed to constitute a part of the personal digital assistant (PDA).

14. The wireless communication device of claim 1, wherein the data processing unit comprises a mass storage memory storing means.

15. The wireless communication device (1) according to claim 14, wherein the configuration data is arranged to be read in the storing means (7) for the configuration data in the data processing unit.

16. The wireless communication device (1) according to claim 15, wherein the data processing unit (3) is a personal digital assistant (PDA) and that the basic part (2) is an interface card arranged to be connected to the personal digital assistant (PDA) or the basic part (2) formed to constitute a part of the personal digital assistant (PDA).

17. The wireless communication device (1) according to claim 15, wherein the data processing unit (3) is a computer, and that the basic part (2) is a card according to the PCMCIA standard.

18. The wireless communication device of claim 17, wherein the computer is a portable laptop PC.

19. A method for the configuration of a wireless communication device, said wireless communication device comprising:

a basic part having memory means and a control unit for controlling the functions of the wireless communication means;

an adapter unit arranged to be coupled to the basic part and comprising means for transmitting information between the wireless communication device and at least one data transmission network, and means for storing the type data of the adapter unit, which type data identifies said data transmission network, and means for transferring signals between the basic part and the adapter unit, the method comprising:

identifying the type of adapter unit connected at the time to the basic part, examining, in the basic part, if corresponding configuration data for the adapter unit which has been identified, can be found in the basic part;

loading the corresponding configuration data, for use in the basic part, if the corresponding configuration data is found in the basic part;

transmitting to a data processing unit a loading request for the corresponding configuration data, if the corresponding configuration data is not found in the basic part;

receiving from the data processing unit the corresponding configuration data for use in the basic unit, if the corresponding configuration data is found in the data processing unit;

loading the configuration data in the basic part, and configuring the wireless communication device on the basis of the configuration data loaded in the basic part.

20. The method according to claim 19, wherein the wireless communication device (1) is connected to a data processing unit (3) comprising means (7) for storing configuration data (syst(1), syst(2), . . . syst(N)) of one or more adapter units, and that the configuration data is loaded from the storing device (7) for the configuration data in the data processing unit (3).

* * * * *